(12) United States Patent
Childers et al.

(10) Patent No.: US 7,152,303 B2
(45) Date of Patent: Dec. 26, 2006

(54) METHOD OF LOCALIZED THERMAL PROCESSING OF INTEGRATED LEAD SUSPENSIONS FOR CONTROLLING THE PITCH STATIC ATTITUDE OF SLIDERS

(75) Inventors: William W. Childers, Morgan Hill, CA (US); Tzong-Shii Pan, San Jose, CA (US); Surya Pattanaik, San Jose, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 298 days.

(21) Appl. No.: 10/651,123

(22) Filed: Aug. 28, 2003

(65) Prior Publication Data

US 2005/0044697 A1 Mar. 3, 2005

(51) Int. Cl.
G11B 5/127 (2006.01)
H04R 31/00 (2006.01)

(52) U.S. Cl. .............................. 29/603.06; 29/603.03; 29/603.04; 29/603.07; 360/244.2; 360/244.8; 360/294.4; 360/294.6; 360/294.7; 360/245.2

(58) Field of Classification Search ............. 29/603.03, 29/603.04, 603.06, 603.07; 360/244.8, 244.2, 360/244, 240, 294.4–294.7, 245.2, 245.4, 360/294, 245

See application file for complete search history.

(56) References Cited

U.S. PATENT DOCUMENTS

| | | | |
|---|---|---|---|
| 4,151,014 A | 4/1979 | Charschan et al. | |
| 5,405,804 A | 4/1995 | Yabe | |
| 5,539,596 A | 7/1996 | Fontana et al. | |
| 5,739,982 A | 4/1998 | Arya et al. | |
| 5,818,662 A | 10/1998 | Shum | |
| 5,828,031 A | 10/1998 | Pattanaik | |
| 5,883,758 A | 3/1999 | Bennin et al. | |
| 5,896,247 A | 4/1999 | Pan et al. | |
| 5,922,503 A | 7/1999 | Spak et al. | |
| 5,956,209 A | 9/1999 | Shum | |
| 5,956,212 A * | 9/1999 | Zhu | 360/245.4 |
| 5,982,584 A | 11/1999 | Bennin et al. | |
| 6,021,022 A | 2/2000 | Himes et al. | |
| 6,055,132 A | 4/2000 | Arya et al. | |
| 6,125,015 A | 9/2000 | Carlson et al. | |
| 6,181,526 B1 | 1/2001 | Summers | |
| 6,201,664 B1 * | 3/2001 | Le et al. | 360/244.9 |
| 6,249,404 B1 | 6/2001 | Doundakov et al. | |
| 6,282,064 B1 | 8/2001 | Palmer et al. | |
| 6,515,832 B1 * | 2/2003 | Girard | 360/245.3 |

FOREIGN PATENT DOCUMENTS

EP 0 834 865 A1 8/1998
JP 11039626 A * 2/1999

OTHER PUBLICATIONS

"Shock analysis of MEMS actuator integrated with HGA for operational and non-operational HDD"; Lim, B.B.; Yang, J.P.; Chen, S.X.; Mou, J.Q.; Lu, Y.; Magnetic Recording Conference, 2002. Aug. 27-29, 2002 pp. WE-P-18-01-WE-P-18-02.*

* cited by examiner

*Primary Examiner*—Paul D. Kim
(74) *Attorney, Agent, or Firm*—Bracewell & Giuliani LLP

(57) ABSTRACT

A method is provided for controlling the pitch static attitude of a slider in an integrated lead suspension head gimbal assembly. The integrated lead suspension includes a load beam, a mount plate, a hinge and a flexure made out of a multi-layer material. Localized heating is applied to the outrigger leads during the process of forming flexure legs to set a stable pitch static attitude, which does not change, by subsequent thermal exposures.

9 Claims, 8 Drawing Sheets

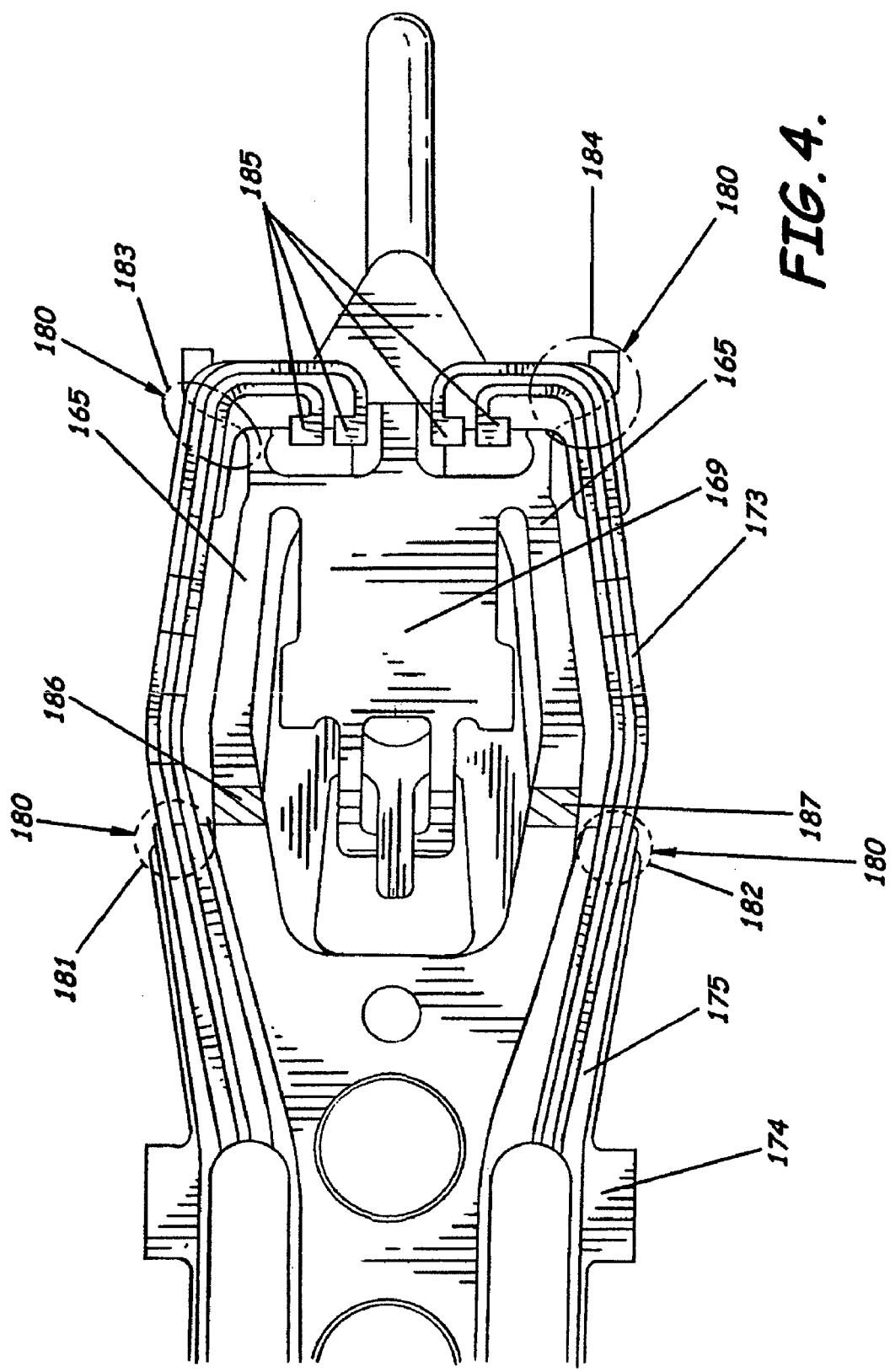

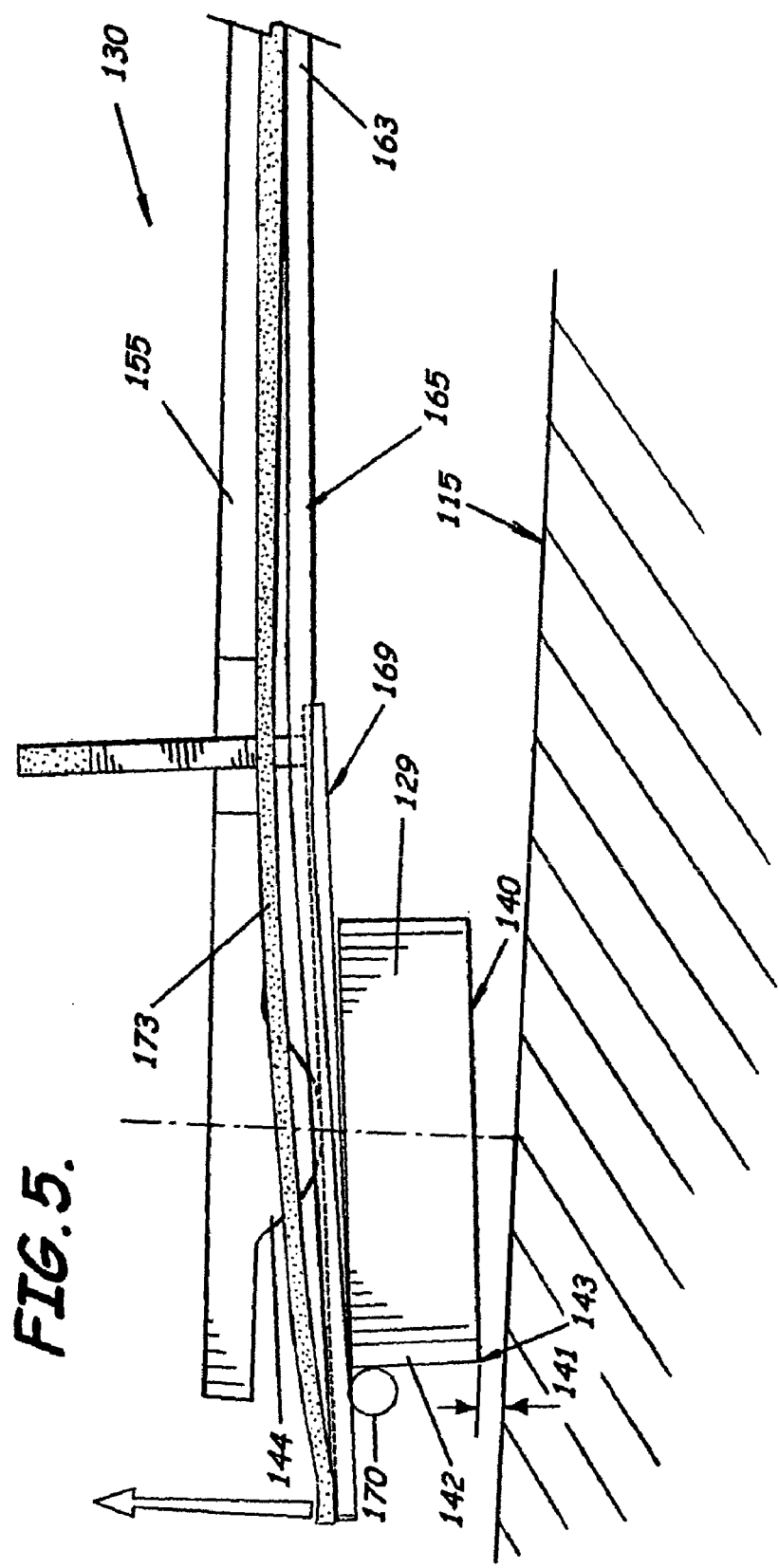

METHOD OF LOCALIZED THERMAL PROCESSING OF INTEGRATED LEAD SUSPENSIONS FOR CONTROLLING THE PITCH STATIC ATTITUDE OF SLIDERS

This patent application is related to U.S. patent application Ser. No. 10/651,112, entitled, Disc Drive with Controlled Pitch Static Attitude of Sliders on Integrated Lead Suspensions by Improved Plastic Deformation Processing, which was filed concurrently with the present patent application.

BACKGROUND OF THE INVENTION

1. Technical Field

The present invention relates in general to head gimbal assemblies for data recording disk drives and, in particular, to localized thermal processing of the outrigger leads on integrated lead suspensions in head gimbal assemblies as an improved system and method for controlling pitch static attitude of sliders in disk drives during the manufacturing of the integrated lead suspensions.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location having an air bearing surface (ABS) that enables the slider to fly at a constant height close to the disk during operation of the disk drive, by a cushion of air generated by the rotating disk. Within most HDDs, the magnetic read/write head transducer is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk. Each slider is attached to the free end of a suspension that in turn is cantilevered from the rigid arm of an actuator. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The suspension of a conventional disk drive typically includes a relatively stiff load beam with a mount plate at the base end, which subsequently attaches to the actuator arm, and whose free end mounts a flexure that carries the slider and its read/write head transducer. Disposed between the mount plate and the functional end of the load beam is a 'hinge' that is compliant in the vertical bending direction (normal to the disk surface). The hinge enables the load beam to suspend and load the slider and the read/write head toward the spinning disk surface. It is then the job of the flexure to provide gimbaled support for the slider so that the read/write head can pitch and roll in order to adjust its orientation for unavoidable disk surface run out or flatness variations.

The flexure in an integrated lead suspension is generally made out of a laminated multi-layer material. Typically, it consists of a conductor layer (like copper), a di-electric layer (like polyimide), and a support layer (like stainless steel). The electrical lead lines are etched into the conductor layer, while the polyimide layer serves as the insulator from the underlying steel support layer. The steel support layer is also patterned to provide strength and gimbaling characteristics to the flexure. The conducting leads, called traces, which electrically connect the head transducer to the read/write electronics, are often routed on both sides of the suspension, especially in the gimbal region. Normally the traces consist of copper conductor with polyimide dielectric layer but no support stainless steel layer and only provide the electrical function. The mechanical function is provided by the flexure legs (stainless steel only), which normally run adjacent to the traces.

The static attitude of the slider is defined by the angular position of the slider ABS with respect to the mounting platform and is specified by design in conjunction with a specific ABS, so that the slider can maintain an optimal flying height for the transducer thereon to read and/or write data on to the recording surface of the disk. To counter the airlift pressure exerted on the slider during disk drive operation, a pre-determined load is applied through a load point on the suspension to a precise load point on the slider. The slider flies above the disk at a height established by the equilibrium of the load on the load point and the lift force of the air bearing. The load of the suspension together with static attitude, control and maintain the optimal flying height of the slider.

The pitch static attitude in a suspension is produced to a desired value by forming the flexure legs, and then adjusting by mechanical/thermal methods. Since, the traces are an integral part of the flexure in an integrated lead suspension, joined to the flexure legs near the transducer bonding area in the front and near the back (leading edge) of the slider in the back, the traces provide resistance to the deformation of flexure leg and deflection of flexure tongue by an opposing force. Hence a significantly higher force is needed to plastically deform the flexure legs to obtain a desired pitch angle that also includes the overcoming the opposite forces produced by the traces. This process leaves residual stresses in the traces and the traces do not remain in the same plane as that of the rest of the flexure. One way to confirm the existence of stress in the traces is to cut the traces or subject the suspension to thermal processes. The stress is relieved by either process and as a result the pitch angle is increased.

This is an inherent problem of the integrated lead suspension. Once the suspension is manufactured by the supplier with formed flexure legs and adjustment to achieve desired pitch angle, it comes with variable amount of stress in the conductive traces. A part or all of the stress is likely to be relieved if and when the said suspension is subjected to a thermal process, thereby changing the pitch static attitude of the suspension or head gimbal assembly.

To successfully achieve file performance, the read/write head must fly steadily at a given fly height over the disk with minimal variations. Since the variations in fly height are dependent on the various sensitivities of the fly height to the process parameters as well as the variability of the parameters, a state-of-the-art air bearing surface (ABS) design and tight process control are mandatory to minimize such variations. Pitch static attitude and variations significantly affect the fly height. Moreover, a very low or negative pitch static attitude can cause disk damage and a very high pitch angle can promote a bi-stable behavior in fly height.

Thus, an improved method, system, and apparatus for controlling process parameters, such as pitch static attitude, of sliders on integrated lead suspensions in head gimbal assemblies for disk drives during the manufacturing thereof is needed.

SUMMARY OF THE INVENTION

The present invention is directed to an improvement in the manufacturing of integrated lead suspension, which overcomes the disadvantages and limitations in the prior art described above.

The integrated lead suspension is a multi-layer assembly having a load beam, a mount plate, a hinge and a flexure. The flexure is made out of a multi layer structure consisting of a support layer, a dielectric layer, and an electrically conductive layer. The flexure has a gimbal area with a flexure tongue to which a slider is attached. The electrically conductive layer is etched to form conductive leads or traces interconnecting the head transducer to the read/write electronics. The traces run parallel to the flexure legs made out of the support layer stainless steel in the gimbal area.

According to the present invention, the pitch static attitude shift and, thus, the variance, can be eliminated or reduced by eliminating or reducing the stresses on the traces. This is achieved by the localized thermal processing of the outrigger leads, preferably in the areas where the traces branch out from the flexure legs near the leading edge of the slider or where they join the flexure legs near transducer bonding area. The localized thermal processing needs to be performed at the same time the flexure leg is formed during the manufacturing of integrated lead suspension to insure a stable pitch static attitude which will not change if subjected to further thermal exposures.

The heat source used to heat the outrigger leads may comprise a laser, an infrared heat source, hot air, or gas, or other sources of thermal radiation such as those commonly known in the art. This step locally deforms the thermoplastic layer located between the copper and stainless steel layers of the suspension to relieve the stresses produced from flexure leg forming. The present invention allows the pitch static attitude of the slider to be maintained within acceptable limits without shift or variance since no further stress relief is possible during and after thermal exposures like the solder ball bonding step.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

FIG. 2b is a perspective view of the head gimbal assembly using the integrated lead suspension of FIG. 2a.

FIG. 4 is a top plan view of a distal portion of an integrated lead suspension.

FIG. 5 is an enlarged side elevational view of a distal portion of the head gimbal assembly of FIG. 4.

DETAILED DESCRIPTION OF THE INVENTION

Figure 1:
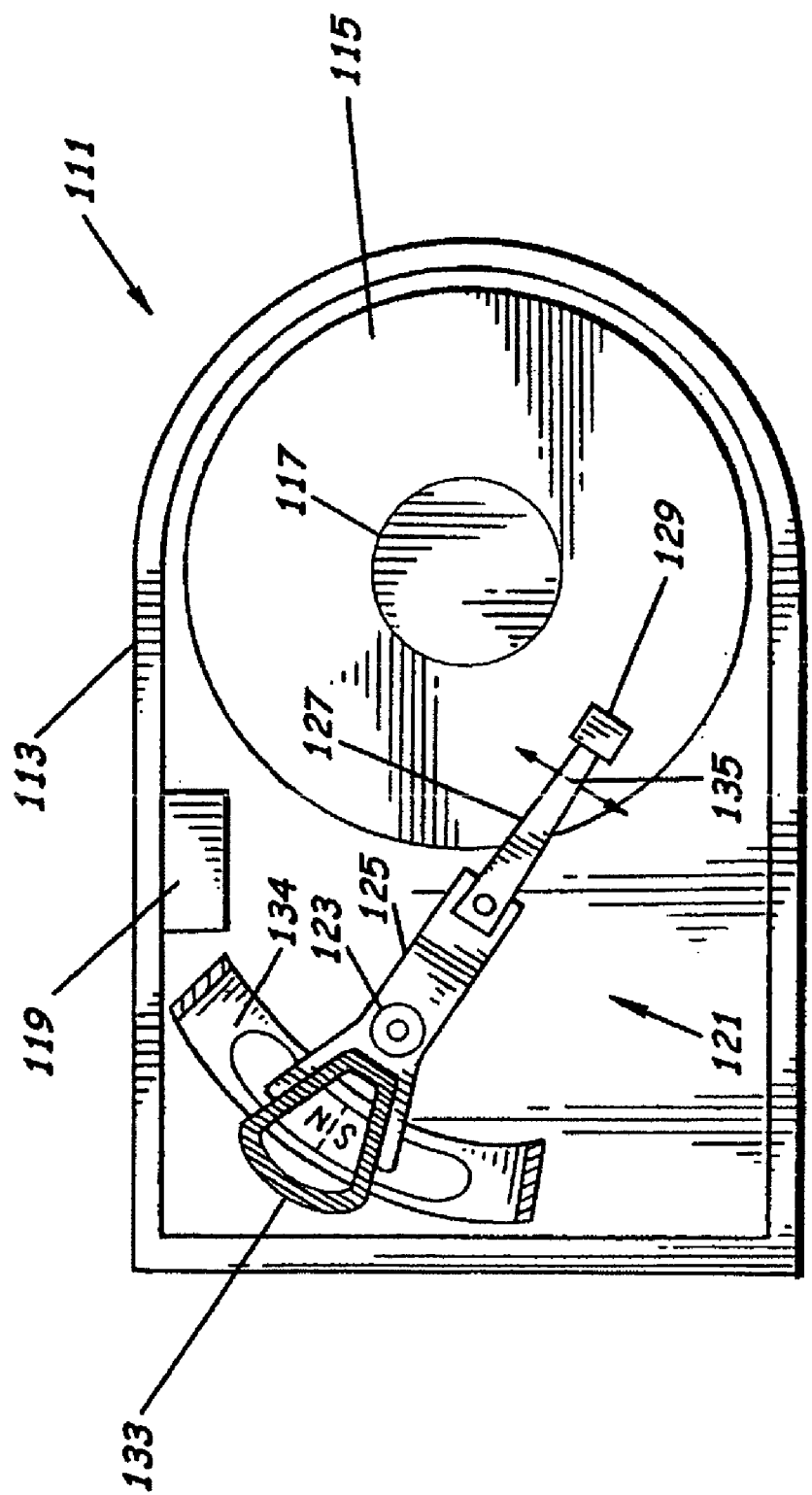
FIG. 1 is a schematic top plan view of one embodiment of a hard disk drive.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered integrated lead suspension 127. A magnetic read/write transducer or head is mounted on a slider 129 and the slider is attached to the end of the integrated lead suspension 127. The read/write heads magnetically read data from and/or magnetically write data to disks 115. The level of integration called the head gimbal assembly 130 is the head and the slider 129, which are mounted on integrated lead suspension 127. The slider 129 is usually bonded to the end of integrated lead suspension 127. In the embodiment shown, the head may be pico size (approximately 1250×1000×300 microns) and formed from ceramic or intermetallic materials. The head also may be nano size (approximately 2050×1600×450 microns), or femto size (approximately 850×700×230 microns). The slider 129 is pre-loaded against the surface of disk 115 (preferably in the range one to four grams) by integrated lead suspension 127.

Integrated lead suspensions 127 have a spring-like quality, which biases or urges the air bearing surface of slider 129 against the disk 115 to enable the creation of the air bearing film between the slider 129 and the surface of disk 115. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the sliders 129 of the head gimbal assemblies radially across tracks on the disks 115 until the heads settle on the target tracks. The head gimbal assemblies operate in a conventional manner and always move in unison with one another, unless drive 111 uses multiple independent actuators (not shown) wherein the arms 125 can move independently of one another.

Figure 2A:
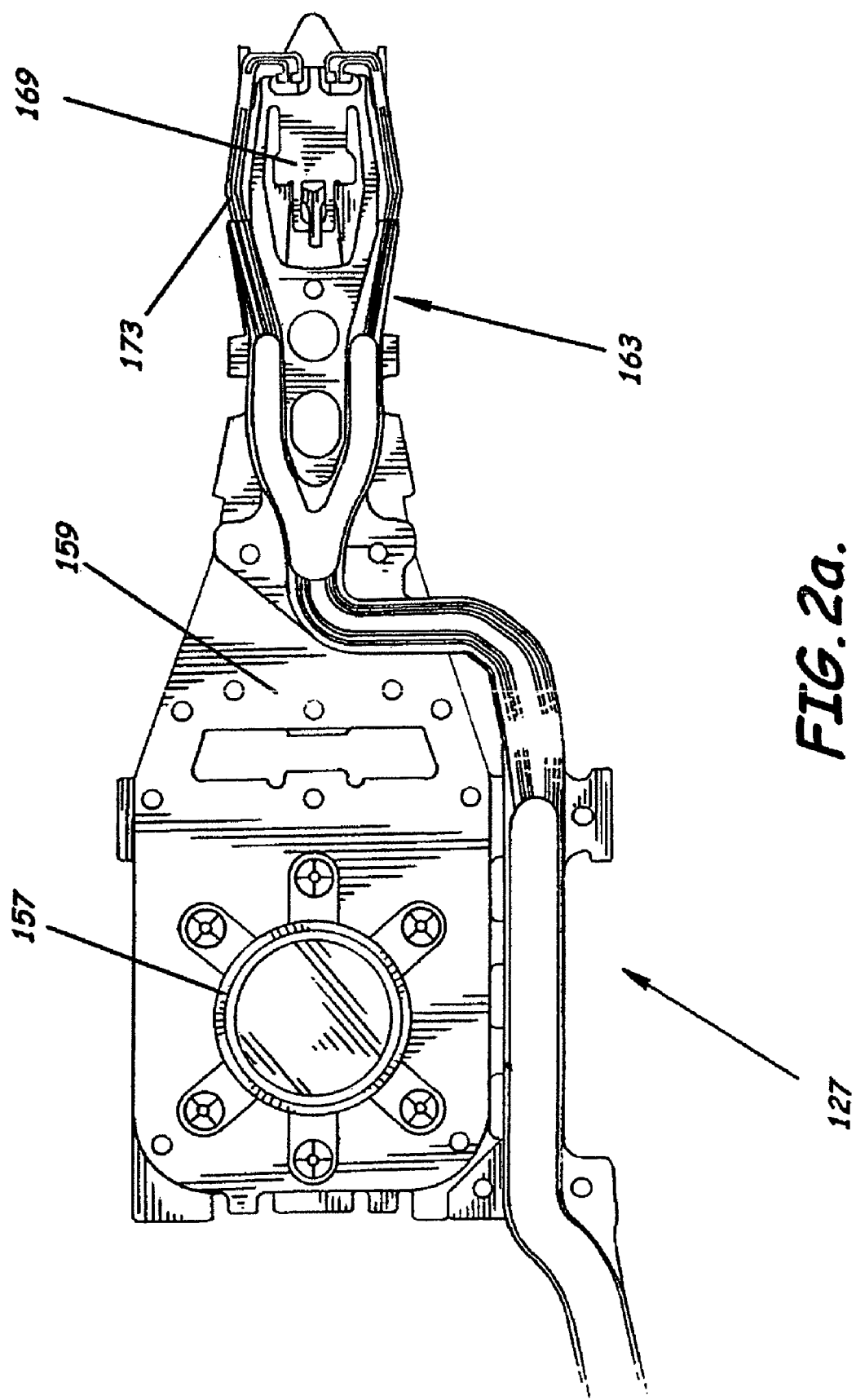
FIG. 2a is a top plan view of an integrated lead suspension utilized by the disk drive of FIG. 1.
Figure 2B:
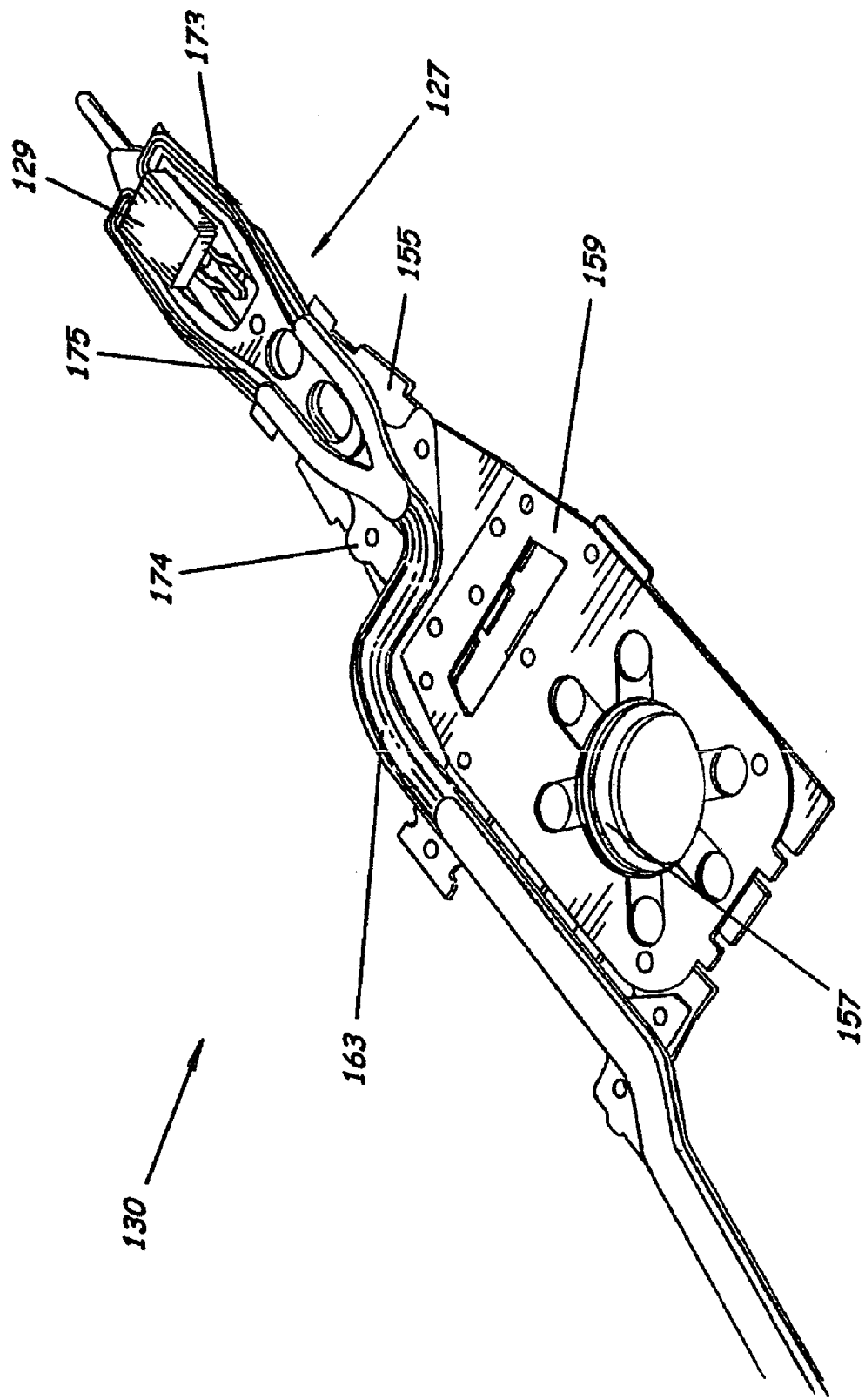

FIGS. 2–4 show various views and details of the head gimbal assembly 130 and the integrated lead suspension 127 for a better understanding of the problem and the present invention. Such an integrated lead suspension 127 comprises a load beam 155, to which is welded a flexure assembly 163. The flexure assembly is generally an elongated structure that is aligned with the load beam 155. The flexure assembly comprises a support layer 174 such as stainless steel, a dielectric layer 175 such as polyimide, and a conductive layer such as copper from which a set of electrical traces 173 have been patterned by etching. The integrated lead suspension 127, also has a hinge 159 and mount plate or base plate 157 welded to the back end which is swaged to the actuator arm 125 during head stack assembly operation.

Figure 3A:
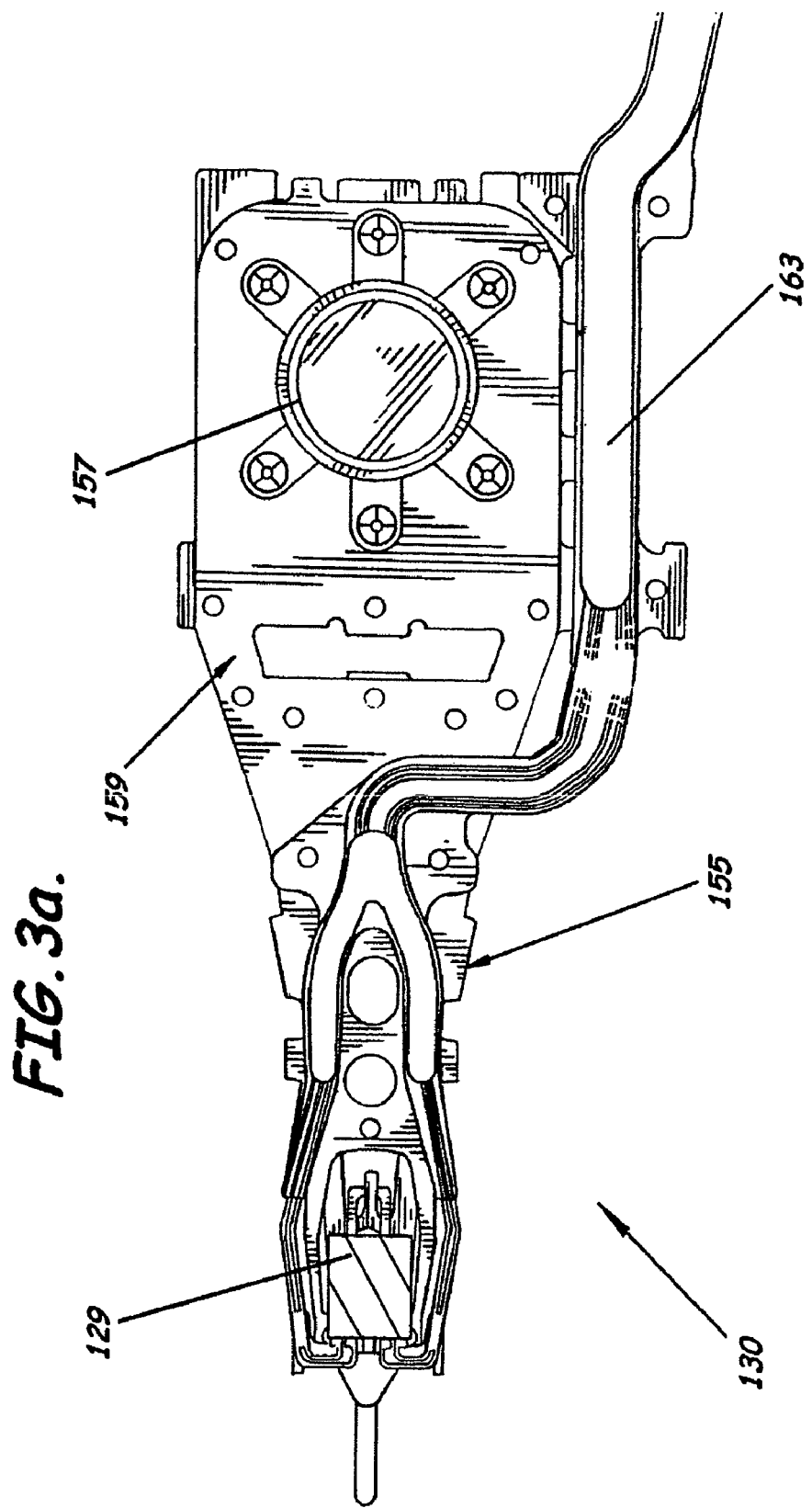
FIGS. 3a and 3b are top plan and side views, respectively, of the head gimbal assembly of FIG. 2b.
Figure 3B:
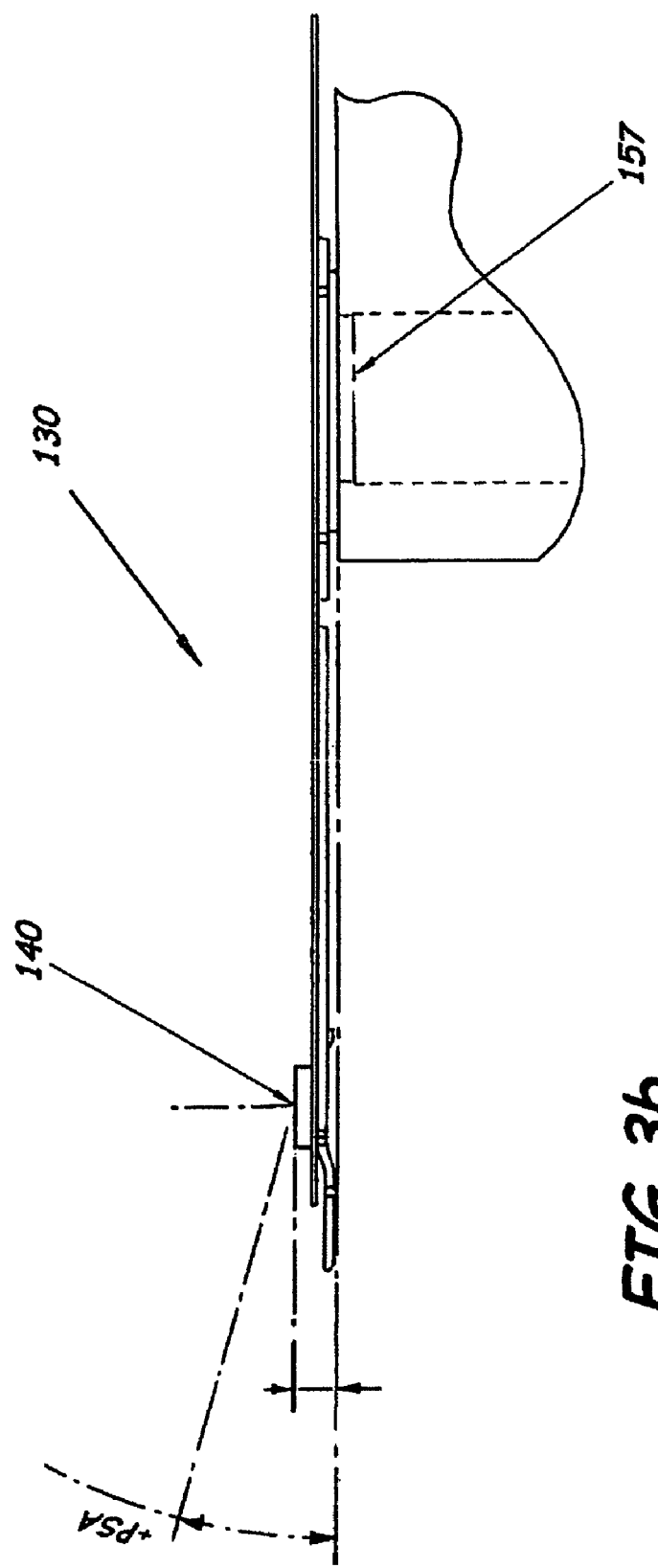

FIG. 3A is a top plan view and FIG. 3B shows a side cross-sectional view of the head gimbal assembly 130, as shown in FIG. 2. The pitch static attitude of a slider in a head gimbal assembly is defined as the angle between the plane of the slider air bearing surface (ABS) 140 and the plane of the mounting surface of the mount plate 157, when the center of the ABS is at the design specific "offset" height (illustrated in FIG. 3B).

FIG. 4 is a top plan view of the gimbal area of the integrated lead suspension 127. As described earlier, the flexure is made out of a multilayer laminate structure having a support layer 174, a dielectric layer 175 and a conductive layer that has been patterned to provide traces 173 to interconnect the head transducer to the read/write electronics. Two flexure legs 165 of support layer stainless steel connect the main body of the flexure to the flexure tongue 169 to which a slider is attached to form a head gimbal assembly. It can be seen from FIG. 4 that the conductive traces 173, on either side of the flexure assembly, run reasonably parallel to the flexure legs 165, except where they are connected to each other in areas 181, 182 towards the back of the flexure tongue and areas 183, 184 towards the front side of the flexure tongue. It is also clear that the conductive traces 173 do not have the support layer stainless steel between areas 181–182 and 183–184. The conductive traces 173 terminate at pads 185 to which the head pads in the slider are connected by various methods. In some cases, the dielectric layer 175 is made by a 3-layer structure; a core layer of Kapton with thin layers of thermo plastic polyimide on either side. The thermo plastic polyimide (TPI) layer has a glass transition temperature (Tg) close to 200 deg C. and helps in bonding of the core Kapton layer to stainless steel base layer 174 on one side and the conductive layer on the other side.

The pitch static attitude of an integrated lead suspension assembly is defined similar to that of the head gimbal assembly (FIG. 3b), as the angle between the plane of the flexure tongue and the plane of mounting area of the mount plate, with the center of the flexure tongue at a specified "offset" height, different from that of head gimbal assembly by the thickness of the slider. In an integrated lead suspension, the desired pitch static attitude is normally achieved by plastically deforming the flexure legs 165 during the manufacturing of the integrated lead suspension, so that the flexure tongue is rotated. The degree of deformation needed depends on the magnitude of pitch static attitude required by design.

Since the flexure legs and traces are connected as described earlier, the traces adjacent to the flexure legs are in a state of stress when the flexure legs are plastically deformed. The deformation of the flexure leg tries to rotate the flexure tongue in a direction away from the dimple (positive pitch static attitude), whereas the traces try to hold them back as they are not plastically deformed. As a result, the final rotation of the flexure tongue, which in turn provides the pitch static attitude, is less than what would have been achieved if the traces were not present. The traces also stay out of the plane of the flexure legs, and bowed as shown in FIG. 5. The existence of stress in the traces, its release and effect on pitch static attitude can easily be verified by cutting the traces. When the traces are cut, the stress is released, the tongue moves to the appropriate position dictated by the deformation of flexure legs without the hold back from traces. As a result the pitch static attitude is increased.

The stress in the traces can also be partially or fully relieved when the integrated lead suspension or head gimbal assembly built thereof is subjected to thermal exposures. In such cases the pitch static attitude will increase to different degrees. One such case is when the slider and integrated lead suspension are electrically connected by a process called solder ball bonding (assignee's U.S. Pat. No. 5,828,031). The pads 185 are connected to the slider bond pads, by placing and reflowing discrete solder balls. The heat applied to melt the solder balls flows thru the traces, and softens the thermo plastic polyimide layer under the traces. Such softening in the areas 183, 184 relieves the stress on the traces from flexure leg forming and increases the pitch static attitude. A similar effect can also be observed if the integrated lead suspension, or the head gimbal assembly is subject to any thermal exposures in the process.

There are several parameters that measure the performance of the slider 129. Fly height 141 (FIG. 5) is the separation between a point on the ABS 140 of the slider 129 and the surface of disk 115, such as the center of the trailing edge 143 of the ABS 140 and the surface of disk 115. Pitch is the tilting of the flying slider 129 in the longitudinal direction (see longitudinal axis 151 and lateral axis 153 in FIG. 6) with respect to the plane of disk 115. Roll (not illustrated) is the tilting of the flying slider 129 in the lateral or transverse direction with respect to the plane of the disk 115. Fly height, pitch, and roll are all dependent on parameters like ambient pressure, temperature, air viscosity, linear velocity (product of radius from center of the disk and disk angular velocity or rpm), skew angle (angle between the longitudinal axis of the slider and the tangent to the current radius from the center of the disk), pre-load (the force applied by, for example, integrated lead suspension 127), integrated lead suspension moments (moments applied in the pitch and roll directions by integrated lead suspension 127), slider flatness, and the design of the slider air bearing 140 itself. The design of the slider 129 targets a low velocity and low skew dependent, fly height profile that remains substantially flat across the radius of the disk 115. The spacing between the head 142 and the disk 115 is described by fly height, together with its pitch and roll.

The performance of a slider head also may be measured in terms of sensitivities. The sensitivities of the slider 129 describe its change in fly height, pitch, or roll when another parameter that affects the fly height changes by one unit. For example, "sensitivity to pre-load" measures the decrease in fly height when the pre-load force is increased by one gram. "Sensitivity to slider flatness" is another parameter. The various surfaces of the slider air bearing are not perfectly flat since the slider 129 exhibits a longitudinal curvature or crown, a transverse curvature or camber, and a cross curvature or twist. Among these features, crown has a significant effect on fly height.

In general, the parameters that affect fly height are associated with the integrated lead suspension 127 (pre-load, location of the dimple 144 with respect to the slider 129, static attitudes in the pitch and roll directions), slider 129 (flatness and size of ABS, etch depths, mask alignment, and rail width), and operating conditions (ambient temperature, pressure, viscosity, and velocity). It is desirable for slider 129 to have low sensitivities since that implies that the departure of fly height from its desired target is small. Each parameter affecting fly height is described statistically by its mean and standard deviation. A tight distribution of values for a parameter around their mean implies that the spread or standard deviation is small.

For example, "fly height sigma" is a statistical estimator of the fly height variation of a group of sliders. This parameter is proportional to the standard deviation of other parameters that affect fly height, and to the sensitivities of the design of air bearing. Thus, by designing a slider to possess low sensitivities, and by ensuring that the manufacturing process is very repeatable, a tight distribution of fly heights is realized.

There are also a number of specific requirements for the head and slider that should be met. Since disks are not perfectly flat and exhibits waviness or curvature that affects fly height, it is desirable that sliders respond consistently to changes in the curvature of the disks. There are at least two disk curvatures of interest. One is in the tangential direction is related to the crown of the slider. Another is in the radial direction and is related to the camber of the slider. Because of the magnitude of the radial curvature near the rim of the disk (also called roll-off or ski jump), it is important for sliders to feature a low transverse curvature sensitivity. The flatness sensitivity of sliders is significant in this respect.

Another requirement for sliders is low fly height and roll sigmas. The variability in fly height of sliders must be consistent. In particular, the roll standard deviation must be small since it is the spacing between the trailing edge 143 (FIG. 5) of head 142 and disk 115 that controls the fly height. If the trailing edge 143 is perfectly parallel to the disk 115, the clearance is uniform. Any amount of roll creates an uneven clearance in the lateral direction between the head 142 and the disk 115.

As a related requirement, sliders should have good load/unload performance. During operation, a slider 129 is loaded onto a spinning disk 115 and must establish its supportive air bearing to avoid contact with the disk 115. Ideally, there will be no exposure to contact during the load/unload sequences. However, physical contact with the disk 115 is almost inevitable and can be a disturbing event on the fly height 141 as it causes the head 142 and slider 129 to lose support and cause damage to the disk 115.

The static attitude of the slider maintains the angular position of the slider with respect to the mounting platform and is specified by design in conjunction with a specific ABS. In this way, the slider can maintain an optimal flying height for the transducer thereon to read and/or write data on to the recording surface of the disk. To counter the airlift pressure exerted on the slider during disk drive operation, a pre-determined load is applied through a load point on the suspension to a precise load point on the slider. The slider flies above the disk at a height established by the equilibrium of the load on the load point and the lift force of the air bearing. The load of the suspension, together with static attitude, control and maintain the optimal flying height of the slider.

The pitch static attitude in a suspension is produced to a desired value by forming the flexure legs, and then making adjustments by mechanical and/or thermal methods during the manufacturing of the suspension. The traces are joined to the flexure legs near the transducer bonding area in front of the slider, and also near the back (i.e., the leading edge) of the slider. Since the traces are an integral part of the flexure in an integrated lead suspension, the traces provide resistance to the deformation of the flexure leg and the deflection of the flexure tongue by an opposing force. Hence, a significantly higher force is needed to plastically deform the flexure legs to obtain a desired pitch angle, which also includes the overcoming the opposite forces produced by the traces. This process leaves residual stresses in the traces, which cause the traces to move out-of-plane with the rest of the flexure. One way to confirm the existence of stress in the traces is to cut the traces or subject the suspension to thermal processes. The residual stresses in the traces are relieved by either process and, as a result, the slider pitch angle is increased.

The presence of residual stresses in the traces is an inherent problem of the integrated lead suspension. Once the suspension is manufactured by the supplier with formed flexure legs and adjustment to achieve a desired pitch angle, it comes with a variable amount of stress in the conductive traces. A part or all of the stress is likely to be relieved if and when the suspension is subjected to a thermal process, thereby changing the pitch static attitude of the suspension or head gimbal assembly.

In one embodiment, the flexure 163 is formed from stainless steel. A set of flexure legs 165 form a portion of the flexure 163 and define an aperture 167 near the distal end of the flexure 163. A tongue 169 extends into the aperture 167 from the flexure legs 165 for providing a mechanical support structure to which the slider 129 is bonded. The flexure legs 165 are spaced apart from the longitudinal axis 151 at a lateral, flexure leg distance 171 that is measured between the longitudinal axis 151 and the flexure legs 165. The flexure leg distance 171 need not be identical for each flexure leg 165.

Figure 6:
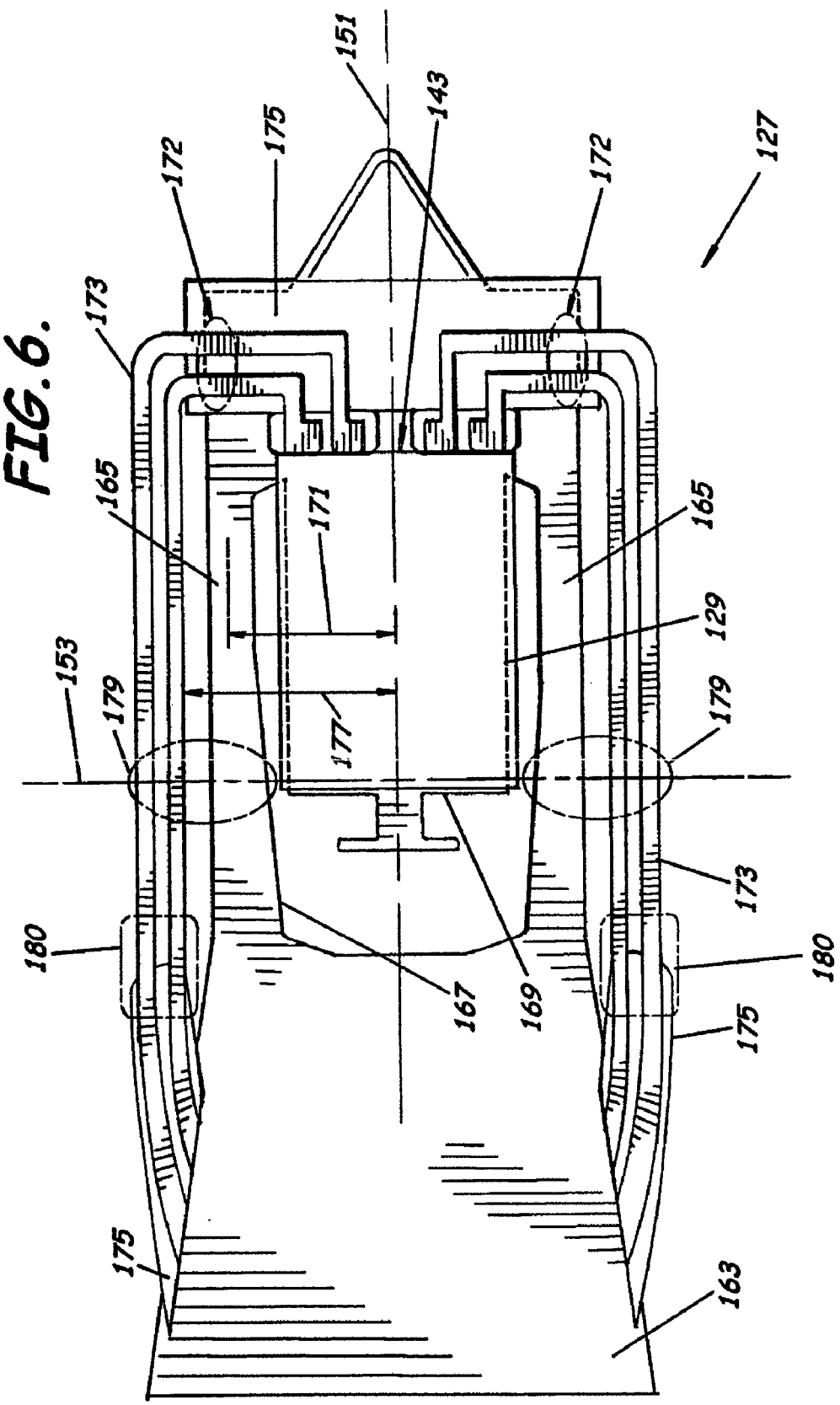
FIG. 6 is a top plan view of the distal portion of the integrated lead suspension of FIG. 5.

Integrated lead suspension 127 also comprises a set of outrigger leads 173 that are mounted to the flexure 163 for carrying electrical signals. In one embodiment, the outrigger leads 173 are formed from copper and are electrically insulated from flexure 163 by insulating layer 175. Insulation 175 may comprise, for example, a dielectric (such as polyimide) that itself is formed from, e.g., three layers of materials. Insulation 175 has as an inert core layer of Kapton® that is covered on each side by another material, such as a thermoplastic polyimide, that bonds to the copper leads 173 and the steel of flexure 163. As shown in FIG. 6, the copper outrigger leads 173 "exit" from the end of stainless steel flexure 163 beyond slider 129 approximately at the areas 172, such that outrigger leads 173 are "outboard" of flexure 163, as will be described below.

In the embodiment shown, the outrigger leads 173 are located on each lateral side of the flexure 163 such that there are outrigger leads 173 located laterally outboard of each of the flexure legs 165. In this version, there are two outrigger leads 173 on each side of the integrated lead suspension 127. Each of the outrigger leads 173 is laterally spaced apart from the longitudinal axis 151 at an outrigger distance 177 that is greater than the flexure leg distance 171. The various individual outrigger leads 173 typically have different outrigger distances 177, but each of the outrigger legs 173 is completely laterally outboard of the flexure legs 165.

The slider 129 mounted to the tongue 169 of the flexure 163 such that electrical contact is established between the slider 129 and the outrigger leads 173. The slider 129 is electrically interconnected with the outrigger leads 173 by solder ball bonding, which requires significantly high temperatures (approximately 200+ degrees C.) to reflow the solder balls 170 (FIG. 5). Such relatively high temperatures during the head gimbal assembly manufacturing process causes the pitch static attitude 145 of the slider 129 to go out of control in the prior art as the excess heat from solder ball bonding flows through the conductors of outrigger leads 173. Solder ball bonding thermally affects the residual stress level in the outrigger leads 173 and, thus, affects the pitch static attitude 145 of the slider 129. The outrigger leads 173 have residual stress due to the techniques used to form them in the prior art. A similar effect can also be observed if the integrated lead suspension or the head gimbal assembly is subjected to any elevated temperature thermal exposures.

In one embodiment of the current invention, the stresses in the traces are eliminated at the source, that is, during the flexure leg forming to attain a stable and desired pitch static attitude (PSA) 145. This can be achieved by applying localized heat from a heat source 180 to the outrigger leads 173 (FIG. 4) at the same time the flexure legs are formed during the manufacturing of integrated lead suspension. Localized heating of outrigger leads softens and deforms the polyimide layer between the copper and steel, more specifically the thermo plastic polyimide (TPI) layer under the traces and relieves the stress produced from flexure leg forming. As a result, the traces are stress free and a stable pitch static attitude is attained which does not change with thermal exposures like solder ball bonding.

The heat source may comprise a laser, infrared heat, and hot air or gas, for example. The localized thermal exposure can be on the entire lengths of the traces adjacent to flexure legs 165, and more specifically in areas where the traces and flexure legs meet with each other (areas 181–182 and 183–184 in FIG. 4).

In operation, the present invention also comprises a method of setting the pitch static attitude 145 for the slider 129 on the integrated lead suspension 127. The method comprises providing an integrated lead suspension 127 having a longitudinal axis 151, a lateral axis 153 transverse to the longitudinal axis 151, a load beam 161, a mount plate 162, a flexure 163 having flexure legs 165 and a tongue 169 for providing a mechanical support structure, and outrigger leads 173 for carrying electrical signals. The method further comprises configuring the integrated lead suspension 127 such that each of the outrigger leads 173 is laterally spaced apart from the longitudinal axis 151 at an outrigger distance 177 that is greater than a flexure leg distance 171 between the longitudinal axis 151 and the flexure legs 165, thereby defining said each of the outrigger legs 173 as being completely laterally outboard of the flexure legs 165. Again, the individual distances 171, 177 are not necessarily required to be identical for each flexure leg 165 and outrigger lead 173, respectively. The method may comprise locating the outrigger leads 173 on each lateral side of the flexure 163 such that there are outrigger leads 173 located outboard of each of the flexure legs 165.

The slider 129 is mounted to the tongue 169 of the flexure 163, and electrical contact is established between the slider 129 and the outrigger leads 173 through a heating process that incidentally alters the residual stresses in the outrigger leads 173 and changes the pitch static attitude 145 of the slider 129. This method is ideally designed for integrated lead suspensions (ILS) rather than circuit integrated suspensions (CIS), and preferably includes solder ball bonding the slider 129 to the outrigger leads 173. Prior art ILS joining techniques used gold ball bonding (GBB) to electrically interconnect the leads and slider. Gold ball bonding occurs at relatively low temperatures, such as room temperature, which do not thermally affect the residual stress level in the leads and, thus, do not affect the pitch static attitude of the slider.

The next step of the method of the present invention includes heating, for example, the outrigger leads 173 at the same time the flexure legs are formed during the manufacturing of the integrated lead suspension to obtain a stable pitch static attitude. The heating step may comprise, for example, heating the outrigger leads 173 with the heat source 180, such as a laser, hot air, or infrared heat. Moreover, this step may comprise simultaneously heating all of both outrigger leads 173 at approximately the same longitudinal location 181–182 and/or 183–184 (FIG. 4) along the longitudinal axis 151. In addition, the method may further comprise protecting heat-sensitive or other portions of the assembly from thermal damage.

Ideally, the local heat is applied before solder ball bonding to preemptively eliminate any residual stress that exists in the traces. Moreover, the local heat may be applied during the formation process of the flexure legs 165. As shown in FIG. 4, both the outrigger leads 173 and at least a portion of the insulation 175 are heated by heat sources 180 at positions 181–182 and/or 183–184.

The present invention has several advantages and is ideally suited for providing an improved method, system, and apparatus for controlling process parameters, such as pitch static attitude, of sliders on integrated lead suspensions in head gimbal assemblies for disk drives. The slider of the integrated lead suspension is electrically interconnected with the outrigger leads on the suspension by solder ball bonding. Solder ball bonding requires significantly high temperatures to reflow the solder balls. When such temperatures are applied to the suspension during the manufacturing process, the pitch static attitude of the slider can go out of control as the excess heat from solder ball bonding flows through the conductors of outrigger leads. Solder ball bonding thereby thermally affects the residual stress level in the outrigger leads and, thus, affects the pitch static attitude of the slider.

This problem is overcome by the localized heating of the outrigger leads at the same time the flexure legs are formed to set a stable pitch static attitude, which is not affected by subsequent thermal exposures. This produces a pitch static attitude that is within acceptable limits. In addition, the flexure legs and the outrigger leads may be heated at approximately the same longitudinal location. The heating step may comprise, for example, simultaneously heating both the flexure legs and the outrigger leads. In addition, the problem is preemptively addressed by applying local heat to certain areas of the traces and insulation, before the solder ball bonding step.

While the invention has been shown or described in only some of its forms, it should be apparent to those skilled in the art that it is not so limited, but is susceptible to various changes without departing from the scope of the invention.

What is claimed is:

1. A method of processing an integrated lead suspension, comprising:
   (a) providing an integrated lead suspension having a longitudinal axis, a lateral axis transverse to the longitudinal axis, a flexure having flexure legs, outrigger leads, and insulation located between at least a portion of the flexure and the outrigger leads;

(b) configuring the integrated lead suspension such that at least a portion of each of the outrigger leads is laterally spaced apart from the longitudinal axis at an outrigger distance that is greater than a flexure leg distance between the longitudinal axis and the flexure legs, thereby defining said at least a portion of each of the outrigger leads as being outboard of the flexure legs; and (c) locally heating the outrigger leads during the flexure leg forming process to set a stable pitch static attitude by relieving stress on the outrigger leads.

2. The method of claim 1, wherein step (b) comprises locating at least one outrigger lead on each lateral side of the flexure such that there is at least one outrigger lead located outboard of each of the flexure legs.

3. The method of claim 1, further comprising the attaching a slider to the integrated suspension and solder ball bonding the slider to the outrigger leads.

4. The method of claim 3, wherein step (c) occurs before the solder ball bonding.

5. The method of claim 1, wherein step (c) comprises heating the outrigger leads with a heat source selected from the group consisting of a laser, infrared heat, and hot air.

6. The method of claim 1, wherein step (c) occurs during step (b) when the flexure legs are being formed.

7. The method of claim 1, wherein step (c) comprises heating specific areas of the outrigger leads; the areas where the outrigger leads converge with or diverge from the flexure legs.

8. A method of setting a pitch static attitude for a slider on an integrated lead suspension, comprising:

(a) providing an integrated lead suspension having a longitudinal axis, a lateral axis transverse to the longitudinal axis, a load beam, a mount plate, a flexure having flexure legs and a tongue for providing a mechanical support structure, outrigger leads for carrying electrical signals, and insulation located between at least a portion of the flexure and the outrigger leads;

(b) configuring the integrated lead suspension such that each of the outrigger leads is laterally spaced apart from the longitudinal axis at an outrigger distance that is greater than a flexure leg distance between the longitudinal axis and the flexure legs, thereby defining said each of the outrigger leads as being completely laterally outboard of the flexure legs, such that there are outrigger leads located outboard of each of the tiexure legs;

(c) locally heating the outrigger leads outboard of the fiexure legs during step (b) while the flexure legs are being formed to set a stable pitch static attitude by relieving stress on the outrigger leads;

(d) mounting a slider to the tongue of the flexure by solder ball bonding; and (e) establishing electrical contact between the slider and the outrigger leads through a heating process.

9. The method of claim 8, wherein step (e) comprises heating the outrigger leads with a heat source selected from the group consisting of a laser, infrared heat, and hot air.

* * * * *